United States Patent [19]

Imai et al.

[11] Patent Number: 4,868,854

[45] Date of Patent: Sep. 19, 1989

[54] ESTABLISHMENT OF BIT SYNCHRONIZATION IN A DATA TRANSMITTING/RECEIVING SYSTEM

[75] Inventors: Hiroyuki Imai, Hirakata; Yoshio Horiike, Katano; Masahiro Yamamoto, Yokohama, all of Japan

[73] Assignee: Matsushita Electric Industrial Co., Ltd., Osaka, Japan

[21] Appl. No.: 119,068

[22] Filed: Nov. 10, 1987

[30] Foreign Application Priority Data

Nov. 11, 1986 [JP] Japan .................................. 61-268006
Dec. 26, 1986 [JP] Japan .................................. 61-312086
May 7, 1987 [JP] Japan .................................. 62-111046

[51] Int. Cl.$^4$ ............................................. H04L 7/02
[52] U.S. Cl. ...................................... 375/118; 328/155
[58] Field of Search ................. 375/87, 110, 118, 116, 375/114, 111, 120; 307/511, 514, 269; 328/155, 162

[56] References Cited

U.S. PATENT DOCUMENTS

4,131,856 12/1978 Chapman .............................. 375/118
4,365,210 12/1982 Harrington et al. ................ 375/120

Primary Examiner—Robert L. Griffin
Assistant Examiner—Marianne Huseman
Attorney, Agent, or Firm—Wenderoth, Lind & Ponack

[57] ABSTRACT

The present invention relates to bit synchronization required for a data transmitting/receiving system. An average phase error between edges of an input waveform and edges of an ideal bit synchronous pattern generated internally is taken and the ideal bit synchronous pattern is shifted by the amount corresponding to the average error, so that a sampling signal is generated on the basis of that pattern. Thus, bit synchronization is established by means of software on microcomputer.

5 Claims, 6 Drawing Sheets

ESTABLISHMENT OF BIT SYNCHRONIZATION IN A DATA TRANSMITTING/RECEIVING SYSTEM

BACKGROUND OF THE INVENTION

1. Field of the Invention

The present invention relates to a method of establishing bit synchronization in a data transmitting-/receiving system in which bit synchronization is necessary.

2. Description of the Prior Art

In recent years, a wired or wireless data transmitting/receiving system has been eagerly developed. Generally in the data transmitting/receiving system, the bit synchronization is necessary in order to sample data correctly from a received signal.

In the conventional data transmitting/receiving system, such bit synchronization has been performed by means of hardware, i.e. by use of a bit synchronization circuit. As an example, a bit synchronization circuit disclosed in Japanese laid-open patent application No. 55-102953 will be explained hereinafter.

Plural counter circuits divide frequency of a fundamental clock, thereby generating respectively bit synchronous codes. The counter circuits are reset successively in response to successive edges of an input waveform, whereby time information about edges gf the input waveform is memorized in the counter circuits. The center edge among the detected edges on time-axis is regarded as a correct edge and made to be a reference edge. On the basis of that reference edge, a sampling signal is generated.

In the case of the system composed of hardware as mentioned above, however, a size of the system becomes large an so it is not suitable for the application to a portable equipment. Further it is difficult to carry out the above-mentioned method as it is by means of software, because of the necessity of the multiple counter operation.

SUMMARY OF THE INVENTION

An object of the present invention is to realize the establishment of bit synchronization by means of software using a microprocessor unit (hereinafter briefly referred to as MPU), whereby providing a small-sized terminal equipment.

A method of establishing bit synchronization according to the present invention, comprising: an edge detecting step for detecting positions of edges of an input waveform; a bit synchronizing step for internally generating a bit synchronous code; an error detecting step for detecting errors between the positions of edges of the input waveform and positions of edges of the bit synchronous code; an error averaging step for averaging the errors obtained in the error detecting step; and a sampling step for shifting the bit synchronous code by an amount corresponding to the average error edge obtained in the error averaging step, determining sampling points on the basis thereof and generating a sampling signal.

DESCRIPTION OF THE PREFERRED EMBODIMENT

Figure 1:
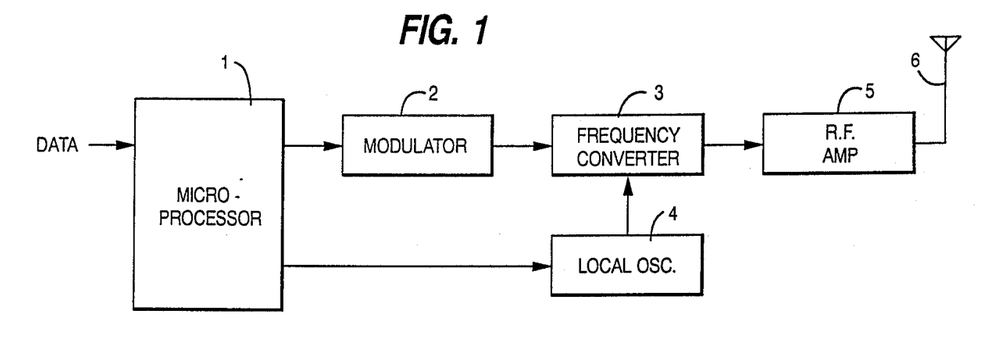
FIG. 1 is a block diagram showing a transmitting apparatus in a data transmitting/receiving system according to the present invention.
Figure 2:
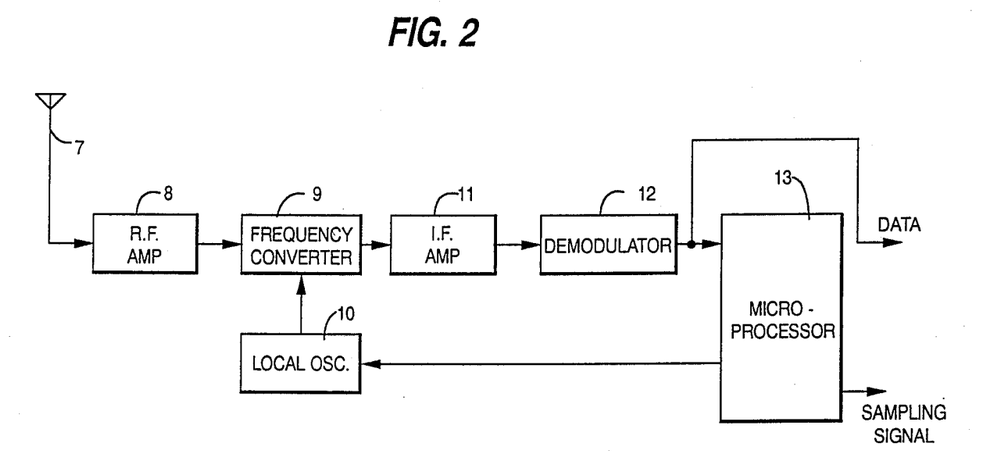
FIG. 2 is a block diagram showing a receiving apparatus in a data transmitting/receiving system according to the present invention.

FIG. 1 is a block diagram showing a transmitting apparatus in a data transmitting/receiving system according to the present invention and FIG. 2 is a block diagram showing a receiving apparatus. Referring to FIG. 1, a numeral 1 denotes an MPU, 2 a modulator, 3 a frequency-converter, 4 a local oscillator, 5 a radio-frequency amplifier and 6 a transmitting antenna. Referring to FIG. 2, a numeral 7 denotes a receiving antenna, 8 a radio frequency amplifier, 9 a frequency-converter, 10 a local oscillator, 11 an intermediate frequency amplifier, 12 a demodulator and 13 an MPU.

Figure 5:
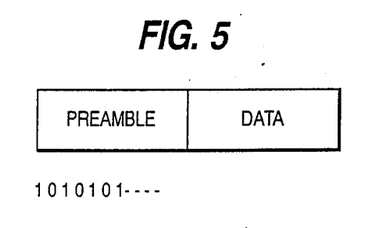
FIG. 5 is a diagram showing a data transmitting format.

Transmitting data are divided into packets by the MPU 1. As show in FIG. 5, a preamble composed of bit synchronous code (101010—) is added in front of the data in each packet. This transmitting data is modulated by the modulator 2, converted into radio frequency (RF) by the frequency converter 3, amplified by the radio frequency amplifier 5 and transmitted from the transmitting antenna 6 as an electromagnetic wave. In the receiver side, the electromagnetic wave is received by the receiving antenna 7, amplified by the radio frequency amplifier 8, converted into an intermediate frequency by the frequency converter 9, amplified by the intermediate frequency amplifier 11 (the operations from the receiving antenna to the intermediate frequency amplifier are similar to those in the conventional superheterodyne receiver), demodulated and shaped the waveform by the demodulator 12 and transferred to the MPU 13. The MPU 13 establishes bit synchronization with the input signal and generates a sampling signal for sampling data. Further, the local oscillators 4 and 10 in the transmitting apparatus and receiving apparatus are controlled their oscillation frequency by the MPUs 1 and 13, respectively.

Figure 3:
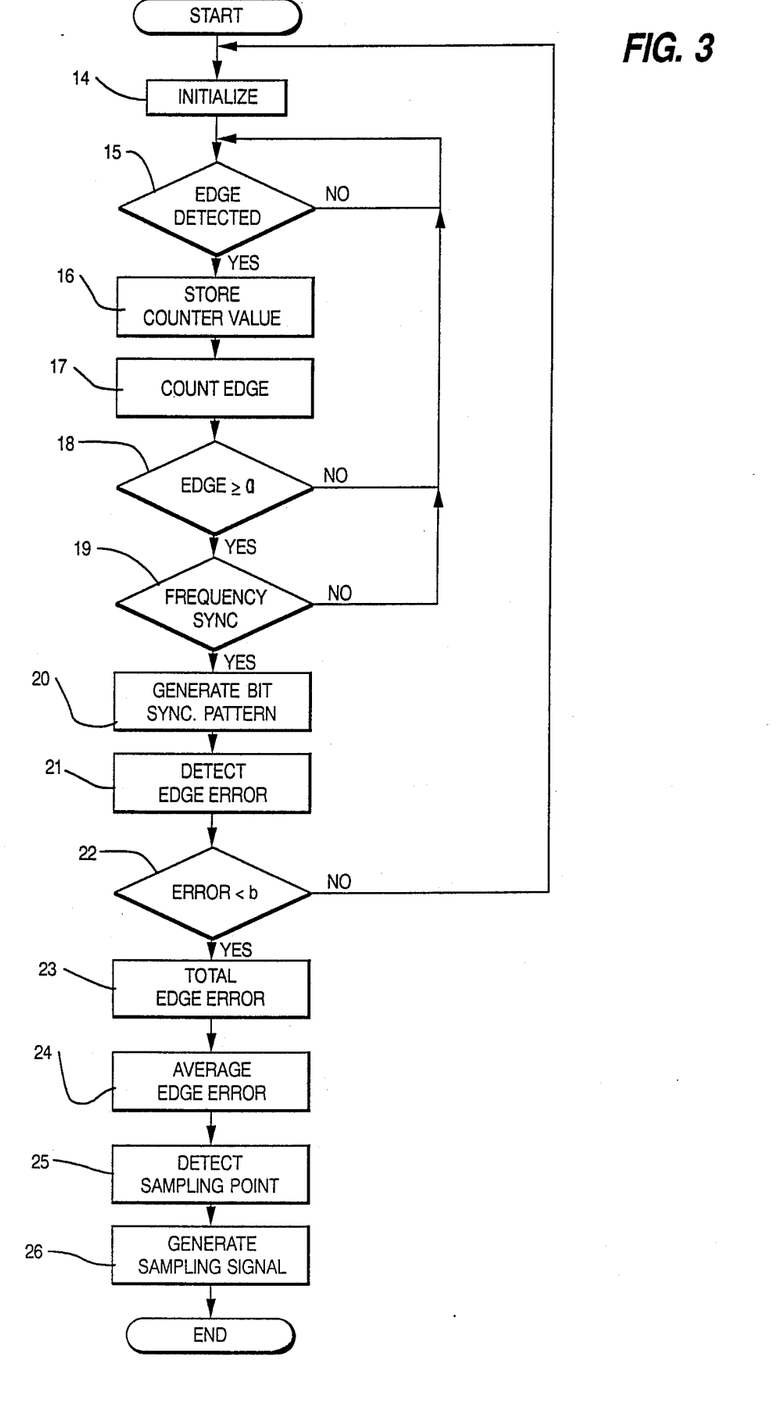
FIG. 3 is a flow chart showing a first method of establishing bit synchronization.
Figure 4:
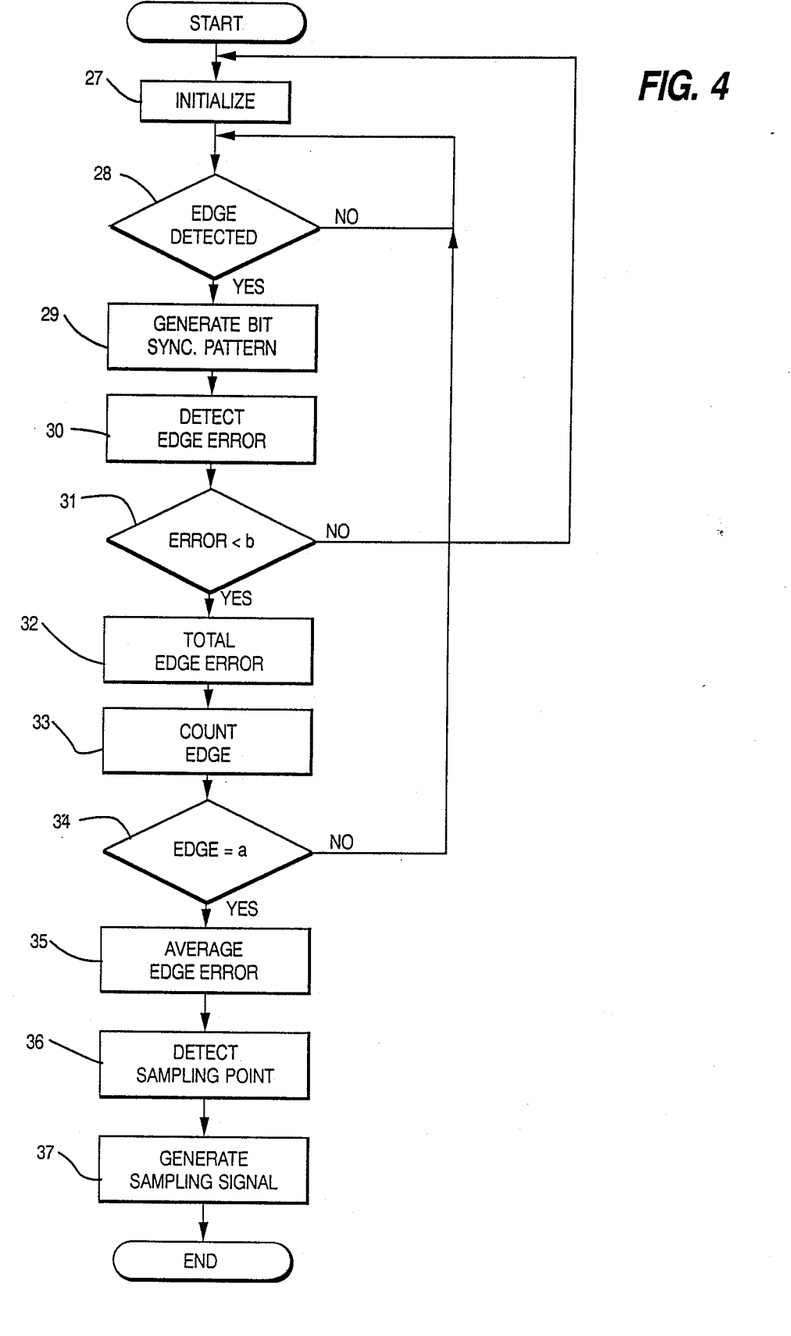
FIG. 4 is a chart showing a second method of establishing bit synchronization.

Next, a method of establishing bit synchronization in the MPU 13 of the receiving apparatus will be described, with reference to FIGS. 3, 4 and 8. FIG. 3 is a flow chart showing a first method of establishing bit synchronization, FIG. 4 is a flow chart showing a second method of establishing bit synchronization and FIG. 8 is a diagram for explaining a method of calculation for establishing bit synchronization.

Figure 8:
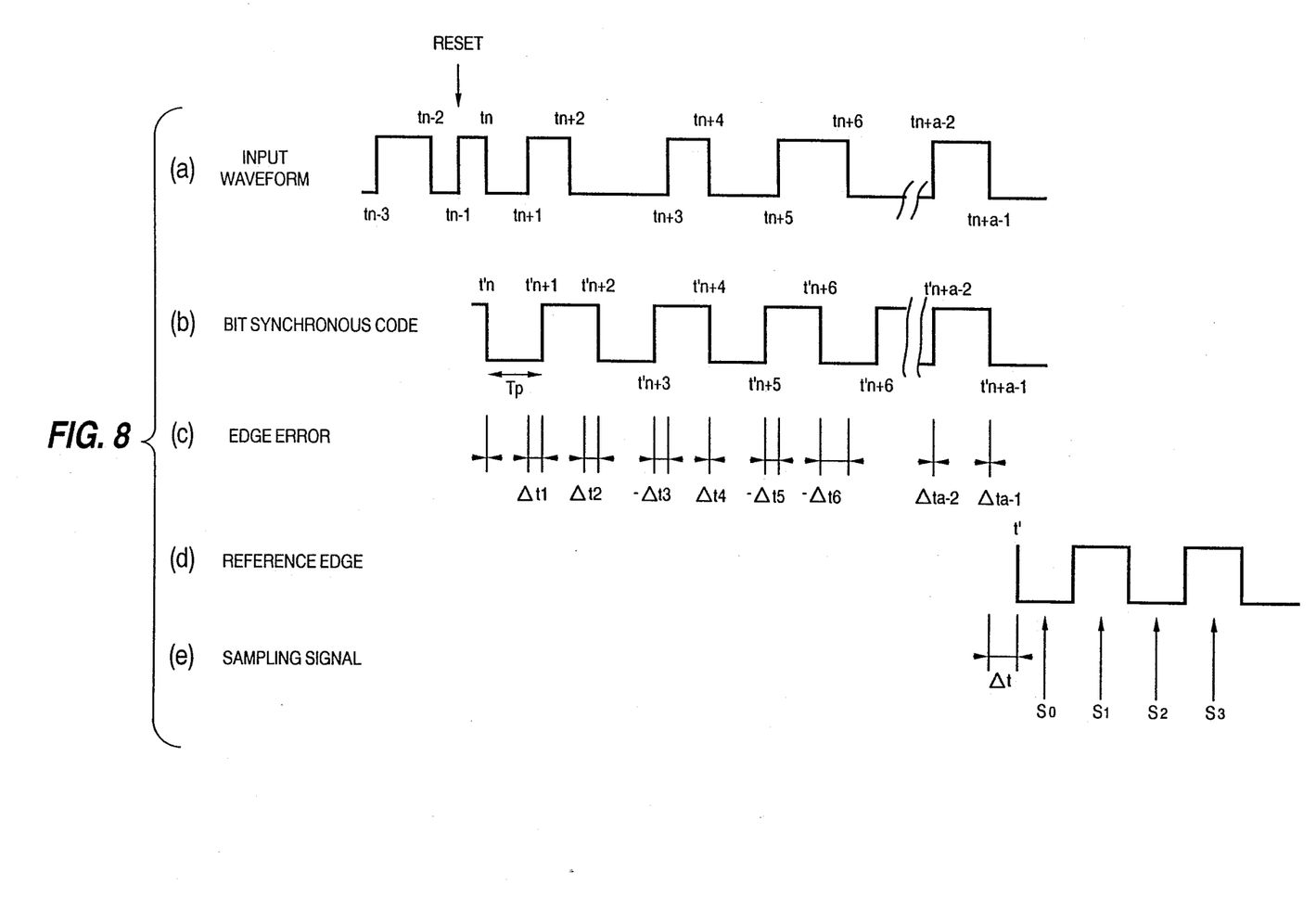
FIG. 8 is a signal timing chart for explaining a method of calculation for establishing bit synchronization.

Referring to FIG. 8, (a) represents an input waveform, (b) a bit synchronous code which is generated internally, (c) edge errors, (d) a reference edge and (e) a sampling signal.

First, the first method of establishing the bit synchronous signal will be described, with reference to FIGS. 3 and 8. Numerals 14 to 26 in FIG. 3 denote steps of respective processes in the MPU 13.

In an initial state, the MPU 13 initializes its conditions (step 14). Then the MPU 13 detects an edge of the input waveform (53 in FIG. 8) from a level change thereof and latches a value of an internal counter which controls time (step 15). When the edge is detected, the counter value $t_n$ is stored in a memory (step 16), and a number of detected edges is counted (step 17). The steps 15 to 17 are repeated until the number of edges becomes a predetermined value (here it is supposed to be "a") (step 18). When the number of edges becomes "a", it is examined if the following relation is satisfied between the counter value $t_{n+a-1}$ of the newest edge and the counter value $t_n$ of the edge at the position "a−1" before (hereinafter referred to as the counter value of the oldest edge) (step 19):

$$T_p \times (a-1) - G < t_{n+a-1} - t_n < T_p \times (a-1) + G \quad (1)$$

$T_p$: pulse width of bit synchronous pattern
G: allowable frequency error

That is to say, the step 19 is the step for checking a frequency synchronization.

If the above-mentioned relation (1) is not satisfied, the steps 15 to 19 are repeated until it is satisfied. If satisfied, the counter value $t_n$ of the oldest edge at that time of the input waveform is made to be a temporary reference edge, and on the basis thereof bit synchronous codes $t'_n$ to $t'_{n+a-1}$ ((b) in FIG. 8) is internally generated, according to the following formula (step 20):

$$t'_{n+i} = t_n + T_p \times i \quad (2)$$

$i = 0$ to $a - 1$

Then errors $\Delta t_i$ ((c) in FIG. 8) between the counter values of respective edges of the actual input waveform ((a) in FIG. 8) and those of the bit synchronous code ((b) in FIG. 8) are calculated from the following formula (step 21):

$$\Delta t_i = t'_{n+i} - t_{n+i} \quad (3)$$

$i = 0$ to $a - 1$

Then it is examined if the error $\Delta t_i$ of every edge ((c) in FIG. 8) is within an allowable range of phase error, according to the following formula (step 22):

$$-b < \Delta t_i < +b \quad (4)$$

$i = 0$ to $a - 1$ b: allowable value of phase error

If any error $\Delta t_i$ out of the above-mentioned relation (4) ((c) in FIG. 8) exists, the operation is stopped and the step 14 is repeated, so that the initialization is carried out. When all of the errors $\Delta t_i$ ((c) in FIG. 8) satisfy the above mentioned relation (4), the errors $\Delta t_i$ of all edges ((c) in FIG. 8) are summed (step 23) according to the following formula 1a (5), and an average $\Delta t$ of the errors of all edges is calculated according to the following formula (6) (step 24):

$$T = \sum_{i=0}^{a-1} \Delta t_i \quad (5)$$

$$\Delta t = T/(a - 1) \quad (6)$$

Next, the counter value $t'_{n+a-1}$ of the newest bit synchronous code ((b) in FIG. 8) is shifted by the amount corresponding to the average error $\Delta t$ to make it a reference edge $t'$ ((d) in FIG. 8). On the basis of this reference edge $t'$, sampling point $S_0$ is determined according to the following formula (7) (step 25), and thereafter, sampling signals $S_n$ ((e) in FIG. 8) are generated according to the following formula (8) to the last of data (step 26).

$$S_0 = t'_{n+a-1} - t + T_p/2 \quad (7)$$

$$S_n = S_0 + T_p \times n \quad (8)$$

$n = 0, 1, 2,$

Although in this first method of establishment, the check of phase error of each edge is performed in the step 22, the establishment of bit synchronization is not affected if that step is omitted. However, it is possibly caused that bit synchronization is established by a received noise. But it is dissolved by inhibiting the operation of the MPU during no signal is received.

Then a second method of establishing bit synchronization is described, with reference to FIGS. 4 and 8. Numerals 27 to 36 in FIG. 4 denote the respective steps of MPU 13.

In an initial state, the MPU 13 initializes its condition (step 27). Then the MPU 13 detects an edge from a level change of the input waveform ((a) in FIG. 8), and latches a value of the internal counter which controls time (step 28). At the detection of the edge, the edge $t_n$ of the input waveform just after the initialization is made to be a temporary reference edge, and on the basis thereof a bit synchronous code $t'_{n+i}$ corresponding to a number i of the edges ((b) in FIG. 8) is internally generated according to the formula (2) (step 29). And errors $\Delta t_i$ between the counter values of the detected edges of the input waveform $t_{n+i}$ ((a) in FIG. 8) and the bit synchronous code $t'_{n+i}$ ((b) in FIG. 8) are calculated according to the formula (3) (step 30), and it is examined if the errors $\Delta t_i$ are within an allowable range ±b of phase error, according to the formula (4) (step 31).

If the formula (4) is not satisfied, the operation is stopped and the step 27 is repeated, so that the initialization is performed. If all errors $\Delta t_i$ ((c) in FIG. 8) satisfy the formula (4), errors $\Delta t_i$ of every edge ((c) in FIG. 8) are accumulated according to the formula (5) (step 32). Then the number of edges is counted (step 33) and the steps 28 to 33 are repeated until the number of edges becomes a predetermined value (here it is supposed to be "a") (step 34).

When the number of edges becomes "a", an average $\Delta t$ of every edge error is calculated from the sum T of every edge error, according to the formula (6) (step 35).

Next, the counter value $t'_{n+a-1}$ ((b) in FIG. 8) of the newest bit synchronous code is shifted by the amount corresponding to the average error $\Delta t$, so that it is made to be a reference edge $t'$ ((d) in FIG. 8). On the basis of this reference edge $t'$, a sampling point $S_0$ is determined according to the formula (7) (step 36). Thereafter, sampling signals $S_n$ ((e) in FIG. 8) are generated according to the formula (8) to the last of data (step 37).

As mentioned above, according to the present embodiments, the bit synchronization operated conventionally by PLL circuit is established by means of software on MPU. Moreover owing to the use of the MPU, additional data processing (error detection, correction, etc.) can be carried out at the same time.

Although in the present embodiment the oldest edge of the input waveform is used as the temporary reference edge, any edge may be chosen as the temporary reference edge. Further although the wireless system is cited as an example of the data transmitting/receiving system, the invention is also similarly applicable to a wired system. In a case of the wired system, even a base-band transmission may be employed.

Since the present invention makes it possible to achieve the function of establishing bit synchronization by means of software on MPU according to the above-mentioned construction, a small-sized equipment is realized. Further, owing to the software processing on MPU, a change of transmission rate, an improvement of performance in the establishment of bit synchronization, etc. may be easily achieved by changing parameters of the software on the same hardware, so that the flexibility of the system is high.

Although the above-mentioned explanation is referred to the methods of realizing the establishment of bit synchronization by the software on MPU, it is possible to perform these methods by means of hardware. Hereinafter constructions therefore and operations thereof are briefly described.

Figure 6:
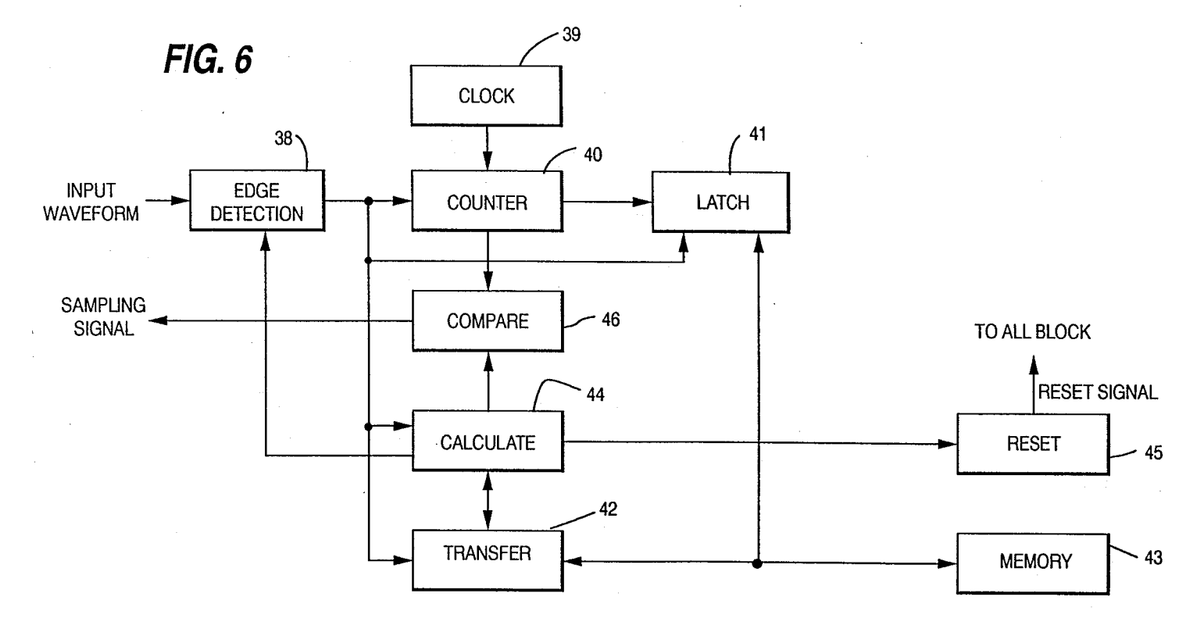
FIG. 6 is a block diagram showing a case where the first method of establishing bit synchronization is realized by means of hardware.

First, an explanation will be made with respect to the first methods of establishing bit synchronization. FIG. 6 is a block diagram showing a construction for realizing the first method of establishing bit synchronization by hardware.

Referring to FIG. 6, a numeral 38 denotes an edge detector circuit, 39 a clock circuit, 40 a counter circuit, 41 a latch circuit, 42 a transfer circuit, 43 a memory circuit, 44 a calculator circuit, 45 a reset circuit and 46 a comparator circuit.

The clock circuit 39 generates the same frequency signals both in transmission and reception, and the counter circuit 40 always operates counting by the use of those signals.

When the edge detector circuit 38 detects an edge of the input waveform ((a) in FIG. 8), it generates an edge detection signal. When receiving this edge detection signal, the latch circuit 41 latches a counter value outputted from the counter circuit 40, so as to make an edge data, and the transfer circuit 42 transfers the edge data latched by the latch circuit 41 to the memory circuit 43. Further, the calculator circuit 44 counts the number of the edges.

The above-mentioned process is repeated and when the number of edges becomes a predetermined value (here it is supposed to be "a"), the calculator circuit 44 reads out, from the memory circuit 43, the newest edge data $t_{n+a-1}$ ((a) in FIG. 8) and the edge data $t_n$ of the position "a−1" before ((a) in FIG. 8), and operates the calculation of the formula (1). If the formula (1) is satisfied, it is supposed that the input frequency is identified (establishment of frequency synchronization), i.e. the bit synchronization code is detected, whereby the operation of the edge detector circuit 38 is stopped.

If the formula (1) is not satisfied, the next edge data $t_{n+a}$ is taken in and the above-mentioned process is repeated until the formula (1) is satisfied.

If the bit synchronous code is detected, then phase synchronization is to be established.

First, suppose the time position at which the bit synchronous code is detected is $t_{n+a-1}$ ((a) in FIG. 8), the oldest edge data $t_n$ ((a) in FIG. 8) is regarded as a temporary reference edge, and on the basis of the reference edge the calculator circuit 44 calculates "a" in number of the edge data $t'_{n+i}$ ((b) in FIG. 8) of the bit synchronous code, according to the formula (2).

Then the calculator circuit 44 calculates the error data $\Delta t_i$ ((c) in FIG. 8) between such edge data ((b) in FIG. 8) of bit synchronous code and the edge data of actual input waveform, according to the formula (3), with respect to all edges to obtain "a−1" in number of data.

In this connection, the calculator circuit 44 examines if the error $\Delta t_i$ of each edge ((c) in FIG. 8) is within the allowable range ±b of phase synchronization error, according to the formula (4).

If any edge error $\Delta t_i$ ((c) in FIG. 8) is out of the allowable range ±b of phase synchronization error, the calculator circuit 44 makes the reset circuit 45 come into operation. Thereby the reset circuit 45 generates reset signal and applies it to all of the other circuits, so that the bit synchronization process is repeated from the start.

If every edge error $\Delta t_i$ ((c) in FIG. 8) is within the allowable range ±b of phase synchronization error, then the calculator circuit 44 calculates the average $\Delta t$ of the every edge error according to the formulas (5) and (6).

This average error $\Delta t$ is the difference between the edge data $t'_{n+i}$ ((b) in FIG. 8) of the bit synchronous code and the edge data $t_{n+i}$ ((a) in FIG. 8) of the actual input waveform, and so the calculator circuit 44 shifts the newest edge data $t'_{n+a-1}$ ((b) in FIG. 8) by the amount corresponding to the average error $\Delta t$, to make it a reference edge data $t'$ ((d) in FIG. 8). On the basis of this internal reference edge data $t'$, the calculator circuit 44 calculates the sampling point $S_0$ ((e) in FIG. 8) according to the formulas (7) and (8).

Thereafter, the calculator circuit 44 calculates the counter value $S_n$ ((e) in FIG. 8) of the next sampling point and inputs the value to the comparator circuit 46. The comparator circuit 46 compares this counter value with a counter value from the counter circuit 40, and if they are identified with each other, the sampling signal ((e) in FIG. 8) is generated.

Figure 7:
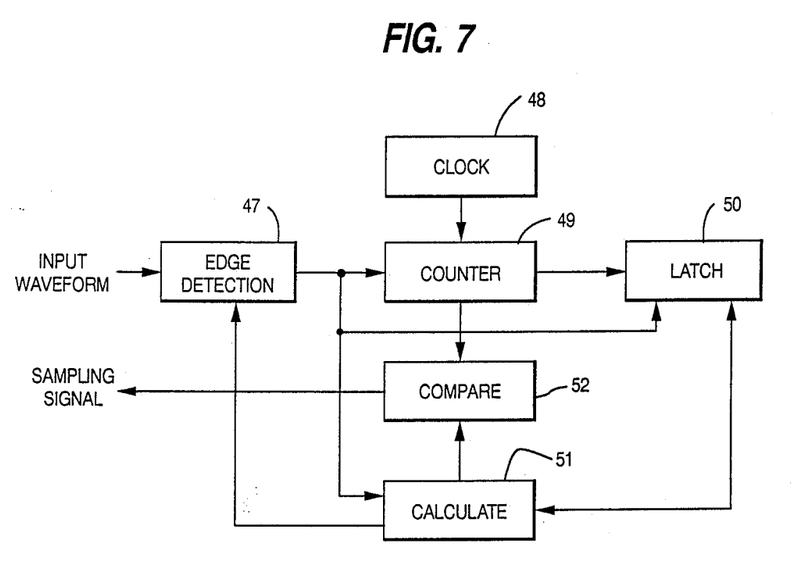
FIG. 7 is a block diagram showing a case where the second method of establishing bit synchronization is realized by means of hardware.

Next, the second method of bit synchronization will be described hereinafter. FIG. 7 is a block diagram showing a system for performing the second method of establishing bit synchronization by hardware.

Referring to FIG. 7, a numeral 47 denotes an edge detector circuit, 48 a clock circuit, 49 a counter circuit, 50 a lath circuit, 51 a calculator circuit and 52 a comparator circuit.

The cock circuit 48 generates the same frequency signals both in transmission and reception, and the counter circuit 49 always operates counting by the use of these signals.

When the edge detector circuit 47 detects an edge of the input waveform ((a) in FIG. 8), it generates an edge detection signal. When receiving this edge detection signal, the latch circuit 50 latches a counter value $t_{n+i}$ ((a) in FIG. 8) from the counter circuit 49 to make it an edge data.

In an initial state, the calculator circuit 51 regards the counter value $t_n$ ((a) in FIG. 8) latched in response to the first edge detection signal as a reference point $t'_n$ ((b) in FIG. 8) for edge data of bit synchronous code.

Thereafter, in response to the edge detection signal, the calculator circuit 51 calculates error $\Delta t_i$ ((c) in FIG. 8) between the edge data $t'_{n+i}$ ((b) in FIG. 8) of the bit synchronous code obtained according to the formula (2) and the edge data $t_{n+i}$ ((a) in FIG. 8) of the actual input waveform according to the formula (3).

And at the same time, it examines if the obtained error $\Delta t_i$ ((c) in FIG. 8) is within the allowable range $\pm b$ of phase synchronization error according to the formula (4).

If the error $\Delta t_i$ of any edge ((c) in FIG. 8) is out of the allowable range of phase synchronization error, the calculator circuit 51 comes back to the initial state and repeats the same bit synchronization process.

If the error $\Delta t_i$ of every edge ((c) in FIG. 8) is within the allowable range of phase synchronization error, a number of the edges is counted and the input of the next edge is waited for.

The above-mentioned calculation is repeated until the number of the edges becomes a predetermined value (here it is supposed to be "a"). When the number of input edges becomes the predetermined value, the above-mentioned calculation is stopped and the average $\Delta t$ of the obtained edge errors is taken according to the formulas (5) and (6).

This average error $\Delta t$ represents a difference between the edge data $T'_{n+i}$ ((b) in FIG. 8) of the bit synchronous code and the edge data $t_{n+i}$ ((a) in FIG. 8) of the actual input waveform, and so the calculator circuit 51 shifts the newest edge data $t'_{n+a-1}$ ((b) in FIG. 8) by the amount corresponding to the average error $\Delta t$, to make it a reference edge data $t'$ ((d) in FIG. 8). On the basis of this internal reference edge data $t'$ ((d) in FIG. 8), the calculator circuit 51 determines a sampling point $S_0$ ((e) in FIG. 8).

Thereafter, the calculator circuit 51 calculates a counter value $S_n$ ((e) in FIG. 8) of the next sampling point and inputs the value to the comparator circuit 52. The comparator circuit 52 compares that counter value with the counter value of the counter circuit 49, and if they are identified with each other, it generates a sampling signal ((e) in FIG. 8).

What is claimed is:

1. A method of establishing bit synchronization required for receiving transmitted data in a data transmitting/receiving system, comprising:
    an edge detecting step for detecting edges of an input waveform;
    a counting step for counting the number of edges detected in said edge detecting step and for repeating said detecting step until said number of edges becomes equal to a predetermined value;
    a frequency synchronizing step for examining a position of each edge detected in said edge detecting step to detect a bit synchronous code and for repeating said edge detecting step until the bit synchronous code is detected;
    a bit synchronizing step for internally generating a bit synchronous code;
    an error detecting step for detecting errors between position of edges of said input waveform and positions of edges of said bit synchronous code;
    an error averaging step for averaging the errors obtained in said error detecting step; and
    a sampling step for shifting said bit synchronous code by an amount corresponding to the average error obtained in said error averaging step, thereby determining sampling points and generating a sampling signal.

2. A method as claimed in claim 1, further comprising, next to said error detecting step, an error checking step for determining if any of said errors obtained in said error detecting step is within a predetermined allowable range, and if any of said errors is out of the predetermined allowable range, returning to said edge detecting step.

3. A method of establishing bit synchronization required for receiving transmitted data in a data transmitting/receiving system, comprising:
    an edge detecting step for detecting edges of an input waveform;
    a bit synchronizing step for internally generating a bit synchronous code corresponding to a number of edges of said input waveform;
    an error detecting step for detecting errors between positions of edges of the input waveform and positions of edges of said bit synchronous code;
    an error checking step for determining if any of the errors obtained in said error detecting step is within a predetermined allowable range, and if any of the errors is out of the predetermined allowable range, returning to said edge detecting step;
    an error accumulating step for accumulating said errors if each of the errors is determined to be within the predetermined allowable range in said error checking step;
    a number checking step for counting the number of edges detected in said edge detecting step and for repeating said edge detecting step, said bit synchronizing step, said error detecting step, said error checking step and said error accumulating step until said number of edges becomes equal to a predetermined value;
    an error averaging step for taking an average of the errors obtained in said error accumulating step; and
    a sampling step for shifting said bit synchronous code obtained in said bit synchronizing step by an amount corresponding to the average error obtained in said error averaging step, thereby determining sampling points and generating a sampling signal.

4. An apparatus for establishing bit synchronization in data transmitting/receiving system, comprising:
    a clock circuit for generating clock signals;
    a counter circuit for counting time using said clock signals;
    an edge detecting circuit for detecting edges of an input waveform and for generating an edge detection signal upon detecting each of said edges;
    a latch circuit for latching a counter value of said counter circuit in response to said edge detection signal;
    a memory circuit for storing a predetermined number of counter values of said counter circuit;
    a transfer circuit for transferring said counter value from said latch circuit to said memory circuit in response to said edge detection signal;
    a calculator circuit for detecting a pattern of bit synchronization of said input waveform from the counter values stored in said memory circuit, and for determining an average error between said pattern of bit synchronization and a predetermined ideal bit synchronous pattern and for determining a value representing a data sampling point from each of the counter values stored in said memory circuit and from said average error; and a comparator circuit for comparing said value representing the data sampling point obtained in said calculator circuit with the counter value of said counter circuit, and generating, if the compared values are identical, a sampling signal, whereby bit synchronization is established.

5. An apparatus as claimed in claim 4, further comprising:

a reset circuit for generating a reset signal in order to reset all of said circuits to their initial states, if error obtained in said calculator circuit is larger than a predetermined value.

* * * * *